United States Patent
Geuens et al.

(10) Patent No.: US 12,331,892 B2
(45) Date of Patent: *Jun. 17, 2025

(54) GAS NETWORK AND METHOD FOR THE SIMULTANEOUS DETECTION OF LEAKS AND OBSTRUCTIONS IN A GAS NETWORK UNDER PRESSURE OR VACUUM

(71) Applicant: ATLAS COPCO AIRPOWER, NAAMLOZE VENNOOTSCHAP, Wilrijk (BE)

(72) Inventors: Philippe Geuens, Wilrijk (BE); Ebrahim Louarroudi, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 569 days.

This patent is subject to a terminal disclaimer.

(21) Appl. No.: 17/299,976

(22) PCT Filed: Nov. 26, 2019

(86) PCT No.: PCT/IB2019/060165
§ 371 (c)(1),
(2) Date: Jun. 4, 2021

(87) PCT Pub. No.: WO2020/115609
PCT Pub. Date: Jun. 11, 2020

(65) Prior Publication Data
US 2021/0381654 A1    Dec. 9, 2021

(30) Foreign Application Priority Data
Dec. 7, 2018   (BE) .................................. 2018/5862

(51) Int. Cl.
*F17D 5/00*        (2006.01)
*F15B 11/06*       (2006.01)
(Continued)

(52) U.S. Cl.
CPC .............. *F17D 5/005* (2013.01); *F15B 11/06* (2013.01); *F15B 19/005* (2013.01);
(Continued)

(58) Field of Classification Search
CPC .. F17D 5/005; F17D 5/02; F15B 11/06; F15B 19/005; F15B 20/005; F15B 2211/40515;
(Continued)

(56) References Cited

U.S. PATENT DOCUMENTS 795,134 A * 7/1905 Jones ........................ B05B 9/01
                                                    91/442
4,796,466 A   1/1989 Farmer
(Continued)

FOREIGN PATENT DOCUMENTS

DE    202008013127 U1    11/2009
DE    202010015450 U1    2/2011
(Continued)

OTHER PUBLICATIONS

Mohammad Burhan Abdulla et al., "Pipeline Leak Detection Using Artificial Neural Network: Experimental Study", U2013 Proceedings of International Conference on Modelling, Identification & Control (ICMIC), Cairo, Egypt, Aug. 31-Sep. 2, 2013.*

(Continued)

*Primary Examiner* — Alexander Satanovsky
(74) *Attorney, Agent, or Firm* — Workman Nydegger

(57) ABSTRACT

A method is provided for the simultaneous detection, localization, and quantification of leaks and obstructions in a gas network under pressure or vacuum. The gas network includes: one or more sources of compressed gas or vacuum; one or more consumers or consumer areas of compressed gas or vacuum applications; pipelines or a network of pipelines to transport the compressed gas or vacuum from the sources to the consumers, consumer areas or applica- (Continued)

tions; a plurality of sensors providing one or more physical parameters of the gas at different times and locations within the gas network. The gas network is further provided with controllable or adjustable relief valves, controllable or adjustable throttle valves and possibly one or a plurality of sensors capable of monitoring the status or state of the relief valves and/or throttle valves.

20 Claims, 2 Drawing Sheets

(51) Int. Cl.
  *F15B 19/00* (2006.01)
  *F15B 20/00* (2006.01)
  *F17D 5/02* (2006.01)
  *G01M 3/28* (2006.01)

(52) U.S. Cl.
  CPC .............. *F15B 20/005* (2013.01); *F17D 5/02* (2013.01); *G01M 3/2815* (2013.01); *F15B 2211/40515* (2013.01); *F15B 2211/50518* (2013.01); *F15B 2211/55* (2013.01); *F15B 2211/857* (2013.01); *F15B 2211/8855* (2013.01); *F15B 2211/89* (2013.01)

(58) Field of Classification Search
  CPC ........ F15B 2211/50518; F15B 2211/55; F15B 2211/857; F15B 2211/8855; F15B 2211/89; F15B 19/002; F15B 2211/855; F15B 2211/87; F15B 19/007; F15B 2211/20576; F15B 2211/426; F15B 2211/526; F15B 2211/6309; F15B 2211/6323; F15B 2211/634; G01M 3/2815

See application file for complete search history.

(56) References Cited

U.S. PATENT DOCUMENTS

| | | | |
|---|---|---|---|
| 5,272,646 A | 12/1993 | Farmer | |
| 5,648,605 A * | 7/1997 | Takahashi | G01F 25/13 73/197 |
| 6,389,881 B1 | 5/2002 | Yang et al. | |
| 6,711,507 B2 | 3/2004 | Koshinaka et al. | |
| 7,031,850 B2 | 4/2006 | Kambli et al. | |
| 7,049,975 B2 * | 5/2006 | Vanderah | G01D 9/005 340/870.03 |
| 2003/0187595 A1 * | 10/2003 | Koshinaka | F17D 5/02 702/45 |
| 2004/0149946 A1 * | 8/2004 | Bender | F02D 11/10 251/129.04 |
| 2005/0234660 A1 * | 10/2005 | Kambli | F15B 19/005 702/51 |
| 2005/0257595 A1 * | 11/2005 | Lewis | G01N 30/32 73/1.16 |
| 2011/0060542 A1 * | 3/2011 | Guasco | G01B 21/045 702/94 |
| 2013/0066568 A1 | 3/2013 | Alonso | |
| 2016/0356665 A1 * | 12/2016 | Felemban | G01M 3/2807 |
| 2017/0003200 A1 | 1/2017 | McDowell et al. | |

FOREIGN PATENT DOCUMENTS

| | | | | |
|---|---|---|---|---|
| EP | 2342603 | * | 5/2013 | ........ G05B 23/024 |
| EP | 3115666 A1 | | 1/2017 | |
| GB | 2554950 A | | 4/2018 | |
| JP | 09027987 A | | 1/1997 | |
| JP | 2001214867 | * | 8/2001 | ............. F04B 49/00 |
| JP | 2009003954 A | | 1/2009 | |
| WO | 2016161389 A1 | | 10/2016 | |
| WO | 2018106140 A1 | | 6/2018 | |

OTHER PUBLICATIONS

Mohanad Khazaali, "Optimization Procedure to Identify Blockages in Pipeline Networks via non-invasive Technique based on Genetic Algorithms", A Thesis Presented to the Graduate and Research Committee of Lehigh University, May 2017.*
Japanese Office Action from Corresponding Japanese Patent Application No. JP2021-531771, Apr. 24, 2023.
International Search Report and Written Opinion from PCT Application No. PCT/IB2019/060165, Feb. 20, 2020.
Belgian Search Report from corresponding BE Application No. BE201805862, Jul. 4, 2019.
Abdulla et al., "Pipeline Leak Detection Using Artificial Neural Network: Experimental Study," 2013 5th International Conference on Modelling, Identification and Control (ICMIC), Aug. 31-Sep. 2, 2013, pp. 328-332.
Khazaali, "Optimization Procedure to Identify Blockages in Pipeline Networks via non-invasive Technique based on Genetic Algorithms," Lehigh Preserve Institutional Repository, May 1, 2017, Lehigh University.
International Preliminary Report on Patentability from PCT Application No. PCT/IB2019/060165, Nov. 26, 2020.
Belgian Search Report and Written Opinion for BE Application No. BE201805861, Jul. 4, 2019.
International Search Report and Written Opinion from PCT Application No. PCT/IB2019/060166, Mar. 16, 2020.

* cited by examiner

GAS NETWORK AND METHOD FOR THE SIMULTANEOUS DETECTION OF LEAKS AND OBSTRUCTIONS IN A GAS NETWORK UNDER PRESSURE OR VACUUM

BACKGROUND

The current invention relates to a method for the simultaneous detection of leaks and obstructions in a gas network under pressure or under vacuum.

More specifically, the invention is intended to be able to detect and quantify leaks and obstructions that occur in a gas network.

"Gas" herein means for example air, but not necessarily.

"Obstruction" herein means a partial or total blockage in the gas network or an increase in the resistance of a pipeline.

Methods for monitoring or controlling a gas network under pressure are already known, whereby these methods are set up for long and straight pipelines, where the incoming flow is not necessarily equal to the outgoing flow due to the compressibility of the gas in question.

In particular, the methods for the detection of leaks are based on a number of assumptions such as very long pipelines, straight pipelines, which are not suitable for complex gas networks under pressure where one or more compressor plants supply gas under pressure to a complex network of consumers.

Also, methods are already in place, as described in U.S. Pat. Nos. 7,031,850 B2 and 6,711,507 B2, to detect leaks in pneumatic components or tools of the final consumers themselves. A final consumer may be an individual final consumer or include a so-called consumer area or a group of individual final consumers.

Methods for estimating the total leakage rate on the source side are also known from e.g. DE 20.2008.013.127 U1 and DE 20.2010.015.450 U1.

The disadvantage of such known methods is that they do not allow for the detection of leaks and obstructions in a complex network of pipelines between the source and the consumers or consumer areas. Such known methods therefore have the disadvantage of being a source of leaks and obstructions which should not be underestimated.

For the simultaneous detection of leaks and obstructions in the gas network, no specific methods are yet known.

SUMMARY

This invention aims at solving at least one of the aforementioned and other disadvantages.

The current invention relates to a method for the simultaneous detection and quantification of leaks and obstructions in a gas network under pressure or under vacuum; the gas network comprising:
- one or more sources of compressed gas or vacuum;
- one or more consumers (7) or consumer areas of compressed gas or vacuum applications;
- pipelines or a network of pipelines to transport the gas or vacuum from the sources to the consumers, consumer areas or applications;
- a plurality of sensors which determine one or a plurality of physical parameters of the gas at different times and locations in the gas network;

characterized in that the gas network is further provided with a number of controllable or adjustable relief valves, a number of controllable or adjustable throttle valves, and possibly one or a plurality of sensors capable of monitoring the status or state of the relief valves and/or throttle valves, and by the fact that the method comprises the following steps:
- any start-up phase during which the aforementioned sensors are to be used;
- a training phase, in which a mathematical model is established between the measurements of a first group of sensors and a second group of sensors, based on different measurements of these sensors, wherein the controllable or adjustable relief valves and throttle valves are controlled in a predetermined order and according to well-designed scenarios to generate leaks or obstructions;
- an operational phase, in which the mathematical model established between the measurements of the first group of sensors and the second group of sensors is used to detect and quantify leaks and obstructions in the gas network;

wherein the operational phase comprises the following steps:
- controlling the relief valves and, if necessary, the throttle valves in a predetermined order and according to well-designed scenarios;
- reading out the first group of sensors;
- based on these readout measurements, calculating or determining the value of the second group of sensors using the mathematical model;
- comparing the calculated or certain values of the second group of sensors with the read values of the second group of sensors and determining the difference between them;
- determining whether there is a leak and/or an obstruction in the gas network on the basis of the aforementioned difference and any of its derivatives;
- generating an alarm if a leak and/or obstruction is detected and/or determining the location of the leak and/or the obstruction and/or determining the flow of the leak and/or the degree of obstruction and/or generating the leakage cost and/or the obstruction cost.

'A predetermined order' in which the relief valves and throttle valves are controlled means the order, in which the relief valves are controlled and the throttle valves are opened and closed, in case there is more than one.

'Scenarios' refers to the different on and off states of the different relief valves and the different open and closed states of the different throttle valves, for example: [0 0 0 0], [1 0 0 0], [0 1 1 0], . . . . It is possible that there are more states than just on or open (1) and off or closed (0), where an intermediate state (e.g. ½) is equally important for leak detection, obstruction detection and quantification.

The 'derivatives' of the difference means any mathematical quantity that can be extracted from the difference, for example a sum, arithmetic mean, smallest squares sum, . . . .

The 'consumer area' refers to a group of individual (final) consumers. A gas network may contain several consumer groups or consumer areas.

An advantage is that such a method will make it possible to learn, detect and quantify leaks and obstructions in the gas network itself at the same time.

In other words, the leaks and obstructions detected and quantified using the method are not limited to leaks and obstructions in the sources or consumers of compressed gas, i.e. in the compressor plants and pneumatic tools or components, but may also concern leaks and obstructions in the pipelines of the gas network itself.

It should be noted that in the case of a gas network under pressure, leaks will occur to the outside and gas will escape to the surrounding area. In a vacuum gas network, leaks will occur 'inwards', i.e. ambient air will enter the gas network.

During the training phase, using the measurements of the various sensors, a relationship is established between this group of sensors.

Different measurements are made at different settings of the relief valves and/or throttle valves. In other words, different leaks and/or obstructions are generated in the gas network in a specific order under different test scenarios, and then the measurements of the sensors are read out.

On the basis of all the data, a mathematical model is established between the first group of sensors, or the input of the mathematical model, and the second group of sensors, or the output of the mathematical model. The input or mathematical manipulations are also called 'features' of the mathematical model and the output is also called 'targets'.

In this way, a mathematical model will be created that represents the functional relationship between the various parameters measured by the sensors. These parameters or coefficients are also called 'weights'.

This model can then be used to immediately detect irregularities in future measurements of the sensors by comparing the results of the model and the new measurements of the sensors.

In this way, leaks and obstructions will be detected, located and quantified very quickly and accurately and, in case of detection of a leak and/or obstruction, action can be taken and the leak can be closed and/or the obstruction can be repaired.

An additional advantage of a method in accordance with the invention is that the exact topology of the gas network does not have to be known. Knowing the location of the relief valves and throttle valves is, in principle, sufficient to detect, quantify and locate the leaks or obstructions.

Another advantage is that, in accordance with the invention, the method takes into account the entire gas network and can therefore detect, quantify and locate leaks and obstructions in the entire gas network. This means that the network should not be divided into 'sub-networks' to which the method is applied in order to be able to apply the method.

Another advantage is that the method makes it possible to use measurements or datasets of the sensors in the training phase to create the mathematical model, where leaks and obstructions are simulated, instead of having to use data from the sensors where 'real' leaks or obstructions have occurred in the gas network. The generation of the necessary data from the sensors is therefore necessary in order to establish the mathematical model, not dependent on possible leaks or obstructions that have occurred in the past.

Preferably, the operational phase should be temporarily interrupted or stopped at certain times, after which the training phase should be resumed in order to redefine the mathematical model or the relationship between the measurements of different sensors, before the operational phase is resumed.

It should be noted that the process, i.e. the gas network with sources, pipelines and consumers, is not shut down, but only the method. In other words, if the operational phase is temporarily interrupted or stopped, the sources will still supply gas or vacuum to the consumers.

Interrupting the operational phase and resuming the training phase has the advantage that the mathematical model or relationship is updated.

This will make it possible to take into account, for example, detected leaks and obstructions that are being repaired, or adjustments or expansions to the gas network that are being made over time.

The invention also concerns a gas network under pressure or under vacuum; the gas network is at least provided with:
 one or more sources of compressed gas or vacuum;
 one or more consumers, consumer areas of compressed gas or vacuum applications;
 pipelines or a network of pipelines to transport the gas or vacuum from the sources to the consumers, consumer areas or applications;
 a plurality of sensors which determine one or more physical parameters of the compressed gas at different locations in the gas network;
with the characteristic that the gas network is further provided with:
 a number of controllable or adjustable relief valves and a number of controllable or adjustable throttle valves;
 possibly one or a plurality of sensors which can register the state or status of one or a plurality of relief valves and can register one or a plurality of throttle valves;
 a data acquisition control unit for the collection of data from the sensors and for controlling or adjusting the aforementioned relief valves and throttle valves;
 a computing unit for carrying out the method according to any of the preceding claims.

Such an arrangement can be used to apply a method in accordance with the invention.

BRIEF DESCRIPTION OF THE DRAWINGS

To better demonstrate the characteristics of the invention, the following describes, by way of example without any restrictive character, a number of preferred embodiments of a method and a gas network in accordance with the invention, with reference to the accompanying drawings, in which.

DETAILED DESCRIPTION OF VARIOUS EMBODIMENTS

Figure 1:
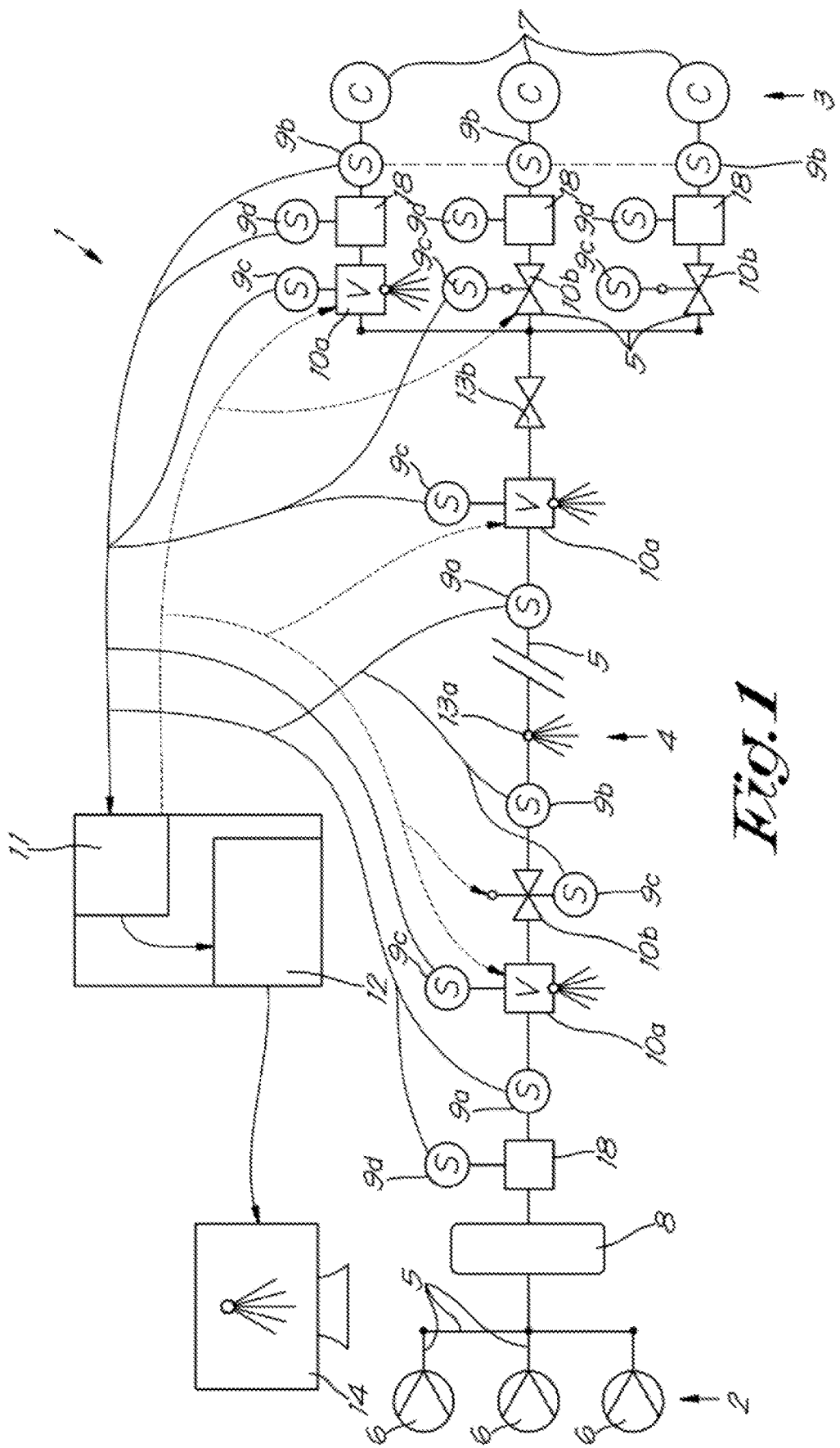
FIG. 1 schematically shows a gas network according to the invention.

The gas network 1 in FIG. 1 comprises mainly a source side 2, a consumer side 3 and a network 4 of pipelines 5 between the two.

The gas network 1 in this case is a gas network 1 under pressure. The gas can be air, oxygen or nitrogen or any other non-toxic and/or hazardous gas or mixture of gases.

The source side 2 comprises a number of compressors 6, in this case three, which generate compressed air. The consumer side 3 comprises a number of consumers 7 of compressed air and in this case also three.

It is also possible that the compressors 6 contain compressed air dryers.

It is not excluded that there may also be compressors 6 downstream of the gas network 1. This is referred to as "boost compressors".

The compressed air is routed through the network 4 of pipelines 5 from the compressors 6 to the consumers 7.

This network 4 is in most cases a very complex network of pipelines 5.

FIG. 1 shows this network 4 in a very schematic and simplified way. In most real situations, the network 4 of pipelines 5 comprises a large number of pipelines 5 and couplings that connect the consumers 7 in series and in parallel with the compressors 6. It is not excluded that a part of the network 4 adopts or comprises a ring structure.

This is because the gas network 1 is often extended over time with additional consumers 7 or compressors 6, whereby new pipelines 5 between the existing pipelines 5 have to be laid, which leads to a tangle of pipelines 5.

The gas network 1 may also be provided with a pressure vessel 8, with all compressors 6 in front of this pressure vessel 8.

It is not excluded that there may be one or more pressure vessels 8 downstream of the gas network 1.

In addition, components 18, such as filters, separators, atomizers and/or regulators, can also be provided in the gas network 1. These components 18 can be found in various combinations and can be found both near the buffer tank 8 and close to the individual consumers 7.

In the example shown, components 18 are provided after the buffer vessel 8 and near the individual consumers 7.

Network 4 also includes a number of sensors 9a, 9b, 9c, which are located at different locations in network 4.

In this case, two flow sensors 9a have been installed, one of which is just after the aforementioned pressure vessel 8, which will measure the total flow q provided by all compressors 6.

It is not excluded that the flow rates of the compressors 6 are calculated or measured by themselves.

In addition, the figure shows four pressure sensors 9b, which measure the pressure at different locations in the network 4.

A pressure sensor 9b to measure the pressure in the pressure vessel 8 is also recommended to correct the "mass in-mass out" principle for large, concentrated volumes.

It is clear that more or less than four pressure sensors 9b can also be provided. In addition, the number of flow sensors 9a is not limiting for the invention.

In addition to flow sensors 9a or pressure sensors 9b, additionally, or alternatively, sensors 9a, 9b may be used to determine one or more of the following physical parameters of the gas: differential pressure, temperature, humidity, gas velocity and the like.

In accordance with the invention, the gas network 1 is also provided with a number of relief valves 10a which can blow off gas from the gas network 1. The relief valves 10a are adjustable or controllable, which means that the amount of gas they vent can be set or regulated.

The relief valves 10a can be formed by drainage valves, which are often provided as standard in a gas network 1. Such drainage valves can be controlled as a relief valve 10a.

In accordance with the invention, the gas network 1 is also provided with a number of throttle valves 10b which are installed in the pipelines 5 at various locations. The throttle valves 10b can partially close off the pipelines 5 to simulate an obstruction, as it were. They are adjustable or controllable, which means that the extent to which they close off the relevant pipeline 5 can be set or controlled.

In addition to the aforementioned sensors 9a and 9b, which measure the physical parameters of the gas, there are also a number of sensors 9c, or 'state sensors 9c', which are located at the relief valves 10a and the throttle valves 10b.

A state sensor 9c at a relief valve 10a will be able to measure the on/off state of the relief valve 10a, while a state sensor 9c at a relief valve 10b will measure the valve opening, i.e. the relative increase or decrease of the thus generated obstruction. The state sensors 9c near the throttle valves 10b can be replaced by pressure differential sensors 9d, which determine the pressure drop over the throttle valves 10b.

Although not explicitly indicated in FIG. 1, it cannot be excluded that in the gas network 1 there are additional state sensors 9c in the vicinity of the compressors 6 and the consumers 7 that determine the on/off state of these components. Preferably, these state sensors are part of the consumers 7 themselves.

The additional state sensors 9c (e.g. on/off of the compressors 6) then aim to significantly reduce the cross-sensitivity of the model during the training phase 16 and the operational phase 17, as explained below.

It is also possible to use sensors 9a, 9b, which measure the pressure or flow of the gas at the relief valves 10a and 10b. It is also possible to use sensors that measure the temperature of the gas at the relief valves 10a and the throttle valves 10b.

Preferably, at least part of the flow sensors, pressure sensors, temperature sensors and/or state sensors 9a, 9b, 9c should be located in the vicinity of the relief valves 10a and the throttle valves 10b.

In this case, each state sensor 9c is located in the vicinity of an relief valve 10a or a throttle valve 10b, one flow sensor 9a is located in the vicinity of an relief valve 10a, one pressure sensor 9b is located in the vicinity of a relief valve 10a and three pressure sensors 9b are located in the vicinity of a throttle valve 10b.

This will make it possible to use the state sensor 9c to determine the state, i.e. open or closed, of the relief valve 10a and of the throttle valves 10b, as well as the valve opening of the throttle valve 10b. In this case, it will be possible to measure with the state sensor 9c the relative obstruction increase or decrease of the concerning throttle valve 10b, which will allow quantification of the degree of obstruction. In addition, with the flow sensor 9a, it will be possible to measure the flow rate of the respective relief valve 10a, which will make it possible to quantify the leakage rate.

Although there is a lot of freedom to choose, which sensor 9a, 9b, 9c or not will be placed at a relief valve 10a or throttle valve 10b, it is preferable to have a sensor 9a, 9b, 9c and/or vice versa in the vicinity of each relief valve 10a or throttle valve 10b in the gas network 1, i.e. near each sensor 9a, 9b a relief valve 10a or throttle valve 10b is provided.

It is also possible that at least part of the sensors 9a, 9b, 9c are integrated in one module together with a relief valve 10a or throttle valve 10b.

This will simplify and speed up the installation or integration of the sensors 9a, 9b, 9c and the relief valves 10a and 10b. In addition, it can be ensured that a correct and suitable sensor 9a, 9b, 9c for the relief valves 10a and throttle valves 10b are placed together in one module.

In this case, and preferably, the state sensors 9c are each integrated in one module with the corresponding relief valve 10a or throttle valve 10b.

The aforementioned differential pressure sensors 9d are preferably placed over filter, separator, atomizer and/or regulator components 18. In the current case, four differential pressure sensors 9d are included in the gas network 1. Differential pressure sensors 9d can also be placed over the throttle valves 10b and then take over the role of the state sensors 9c.

On the other hand, the aforementioned humidity and temperature sensors should preferably be mounted on the inlet/outlet of the compressors 6 and the consumers 7. In the example shown, these additional sensors are not all included in the gas network 1, but it goes without saying that this is also possible. Especially in more extensive and complex gas networks 1 such sensors can be used, as well as in networks where only the volumetric flow rate is measured instead of the mass flow rate.

In accordance with the invention, the gas network 1 is further provided with a data acquisition control unit 11 to collect data from the aforementioned sensors 9a, 9b, 9c, 9d and also to control the relief valves 10a and throttle valves 10b.

In other words, sensors 9a, 9b, 9c, 9d determine or measure the physical parameters of the gas, of the relief valves 10a and the throttle valves 10b, and send this data to the data acquisition control unit 11 and the data acquisition control unit 11 will control or check whether and how much the relief valves 10a and throttle valves 10b are opened or closed to simulate a leak by blowing gas or to create or simulate an obstruction.

In accordance with the invention, the gas network 1 is further provided with a computing unit 12 for processing the data from sensors 9a, 9b, 9c, 9d, wherein the computing unit 12 will be able to carry out the method in accordance with the invention for detecting and quantifying leaks 13a and obstructions 13b in the gas network 1, as explained below.

The aforementioned computing unit 12 can be a physical module which is a physical part of the gas network 1. It cannot be excluded that the computing unit 12 is not a physical module, but a so-called cloud-based computing unit 12, which may or may not be connected wirelessly to the gas network 1. This means that the computing unit 12 or the software of computing unit 12 is located in the 'cloud'.

In this case, the gas network 1 is further provided with monitor 14 to display or signal leaks 13a and obstructions 13b that were detected using the method.

The operation of gas network 1 and the method in accordance with the invention is very simple and as follows.

Figure 2:
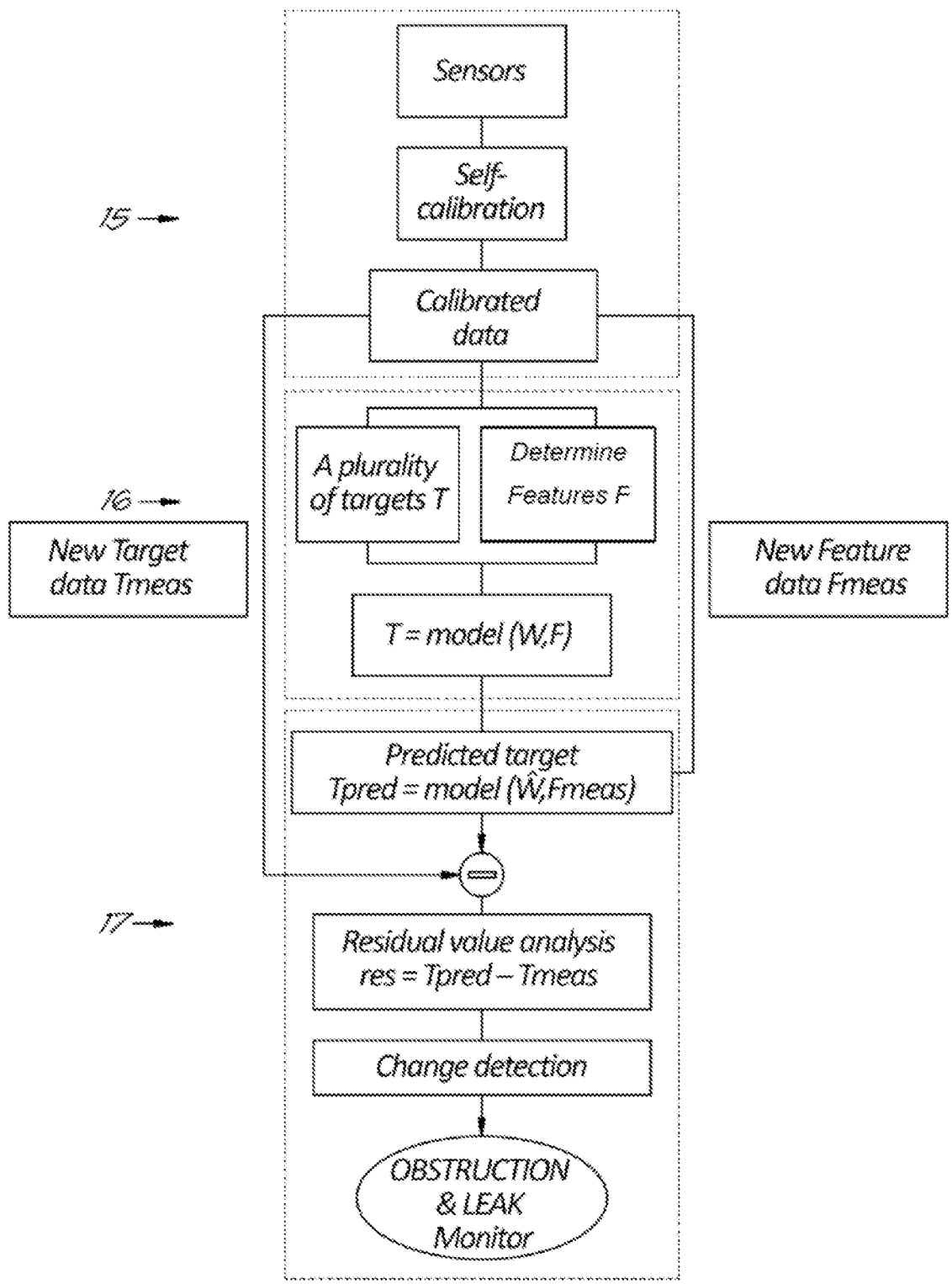
FIG. 2 shows a schematic flowchart of the method in accordance with the invention.

FIG. 2 schematically illustrates the method for the simultaneous detection of leaks 13a and obstructions 13b in the gas network 1 of FIG. 1.

In the first phase 15, start-up phase 15, sensors 9a, 9b, 9c, 9d are calibrated before use if necessary. It goes without saying that if there are other sensors, they can also be calibrated before use.

This happens once when the sensors 9a, 9b, 9c, 9d are placed in the gas network 1. Of course, it is possible that sensors 9a, 9b, 9c, 9d may be recalibrated over time.

Preferably, at least the second group of sensors 9a, 9b, 9c, 9d should be calibrated during operation or by means of an in-situ self-calibration. This means that these sensors 9a, 9b, 9c, 9d in the gas network 1, i.e. after they have been installed, are calibrated. "In operation" or "in situ" means calibration without removing sensor 9a, 9b, 9c, 9d from network 1.

Of course, all sensors 9a, 9b, 9c, 9d and thus the first group of sensors 9a, 9b, 9c, 9d may be calibrated in operation or in situ by means of self-calibration.

In this way one can be sure that the placement and/or possible contamination of the sensors 9a, 9b, 9c, 9d will not affect their measurements, because only after the placement of the sensors 9a, 9b, 9c, 9d will you perform the calibration or repeat the calibration for a certain period of time.

Then the second phase 16 or the training phase 16 starts.

In this phase, a mathematical model is created between the measurements of a first calibrated group of sensors 9a, 9b, 9c, 9d or 'features' and a second calibrated group of sensors 9a, 9b, 9c, 9d or 'targets'.

Preferably, the first group of sensors 9a, 9b, 9c, 9d includes a plurality of pressure sensors 9b at different locations in the gas network, a number of flow sensors 9a and possibly one or a plurality of sensors 9c and the second group of sensors 9a, 9b, 9c, 9d comprises a plurality of flow sensors 9a and state sensors 9c at different locations in the gas network.

In this case, part of the flow sensors 9a, the pressure sensors 9b and part of the status sensors 9c form the first group of sensors and the remaining flow sensors 9a and state sensors 9c form the second group of sensors.

For the sake of completeness, it is stated here that the invention is not limited to this. For the first and second group of sensors a random selection can be made from the sensors 9a, 9b, 9c, 9d with the only restriction that a sensor in the first group is not allowed to be in the second group and vice versa.

The aforementioned mathematical model is based on various measurements of sensors 9a, 9b, 9c, 9d where the adjustable relief valves 10a are controlled to generate leaks and the adjustable throttle valves 10b to generate obstructions.

In other words, data or measurements are collected by the data acquisition control unit 11 from sensors 9a, 9b, 9c, 9d, wherein the data acquisition control unit 11 will control the relief valves 10a in order to open them so that leaks are created in the gas network 1, and wherein the data acquisition control unit will control the throttle valves 10b in order to close them so that obstructions are created in the gas network 1, so that data can be collected from sensors 9a, 9b, 9c, 9d when one or more leaks 13a or obstructions 13b occur in the gas network 1.

In this way, a whole set of data or measurements can be collected, together with the information from the relief valves 10a and throttle valves 10b, i.e. the location and size of the leaks 13a and the location and degree of obstructions 13b. The computing unit 12 will make a mathematical model on the basis of all this information. This mathematical model is preferably a black-box model or a data-driven model. The model typically contains a number of parameters or coefficients, also called 'weights', which are estimated.

This black-box model, for example, takes the form of a matrix, a non-linear mathematical vector function or the like. In an embodiment, the aforementioned mathematical model takes the form of a matrix and/or a nonlinear vector function with parameters or constants, where the changes of the output or 'targets' of the mathematical model are monitored during the operational phase.

The mathematical model is not based on any assumptions.

The training phase 16 should preferably be carried out during the operation of the gas network 1 or when the gas network 1 is operational.

The mathematical model is used in an operational phase 17 to detect and quantify leaks 13a and obstructions 13b in the gas network 1. Although not common, it cannot be excluded that during the operational phase the relief valves 10a are controlled in a predetermined order to locate leaks 13a. It should be noted that control according to scenario [0 0 0] is also possible. It also cannot be excluded that during the operational phase the adjustable throttle valves 10b are controlled in a predetermined order to locate obstructions 13b.

Also during this phase, the data acquisition control unit 11 will collect different data from the sensors 9a, 9b, 9c, 9d and the computing unit 12 will perform the necessary calculations using the mathematical model that was set up in the previous phase 16.

The operational phase 17 starts with the reading of the first group of sensors 9a, 9b, 9c, 9d.

With these read measurements, the value of the second group of sensors 9a, 9b, 9c, 9d is determined or calculated by the computing unit 12 using the mathematical model, also called 'predicted target'.

The determined or calculated value of the second group of sensors 9a, 9b, 9c, 9d is compared with the read values of the second group of sensors 9a, 9b, 9c, 9d and the difference between them is determined.

On the basis of the aforementioned difference, the computing unit 12 determines whether there is a leak 13a or obstruction 13b and, if necessary, the leak 13a or obstruction 13b is located in the gas network 1.

For this purpose, it will be examined whether the difference exceeds a certain threshold, which will then indicate a leak 13a or obstruction 13b in the gas network 1.

This threshold value can be set in advance or selected empirically.

When a leak 13a or obstruction 13b is detected, an alarm will be generated along with possibly the corresponding location, leakage rate, obstruction level and/or the leakage and obstruction cost. In this case, this is done using monitor 14, which displays the alarm.

The user of the gas network 1 will notice this alarm and be able to take the appropriate steps.

The steps of the operational phase 17 are preferably repeated sequentially and cyclically, at a certain time interval.

As a result, leaks 13a and obstructions 13b can be detected during the entire operational period of the gas network 1 and not just once during or shortly after the start up of the gas network 1, for example.

The aforementioned time interval can be selected and set depending on the gas network 1. It cannot be excluded that the time interval may vary over time.

In a preferred variant of the invention, at certain moments, the operational phase 17 will be temporarily interrupted or stopped, after which the training phase 16 will be resumed in order to re-establish the mathematical relationship between the measurements of different sensors 9a, 9b, 9c, 9d, before the operational phase 17 is resumed.

'At certain moments' should herein be interpreted as moments that are preset, for example once a week, per month or per year, or as moments that can be chosen by the user.

This will update the mathematical model to take into account the possible time-varying behavior of the system. These time-varying behaviors are behaviors that were not captured by the mathematical model during the training phase 16 when the mathematical model was trained under different scenarios.

This could include, for example, changes in the topology of gas network 1 or the addition of new components to gas network 1.

Although in the example of FIG. 1 it is a gas network 1 under pressure, it can also be a gas network 1 under vacuum.

Source side 2 then comprises a number of sources of vacuum, i.e. vacuum pumps or similar.

In this case, the consumers 7 have been replaced by applications that require vacuum.

Furthermore, the method is the same as described above, taking into account that leaks 13a now introduce ambient air into the gas network 1. Preferably, other thresholds will be set to generate an alarm.

Also, in this case the relief valves 10a will introduce ambient air into the gas network 1, rather than blowing off real air. The relief valves 10a are therefore more likely to be suction valves. However, the principle remains the same.

This invention is by no means limited to the embodiments described by way of example and shown in the figures, but a method and a gas network in accordance with the invention can be realized in all kinds of variants without going beyond the scope of the invention.

The invention claimed is:

1. A method for detection, localization and quantification of leaks and obstructions in a gas network under pressure or vacuum; the gas network including: one or more sources of compressed gas or vacuum; one or more consumers or consumer areas of compressed gas or vacuum applications; pipelines or a network of pipelines to transport the compressed gas or vacuum from the sources to the consumers, consumer areas or applications; a plurality of sensors providing one or more physical parameters of the gas at different times and locations within the gas network; wherein the gas network is further provided with a number of controllable or adjustable relief valves, a number of controllable or adjustable throttle valves and one or a plurality of sensors capable of monitoring the status or state of the relief valves and/or throttle valves; the method comprising the following steps:

during a training phase, establishing a mathematical model between measurements of a first group of sensors and a second group of sensors and based on different measurements of the first and second groups of sensors;

wherein the first group of sensors are selected from the group consisting of a plurality of pressure sensors, a plurality of flow sensors, a plurality of sensors for determining the state of the relief valves and throttle valves, and one or a plurality of differential pressure sensors, at different locations in the gas network;

wherein the second group of sensors comprises a plurality of flow sensors and sensors capable of determining the state of the throttle valves at different locations from the first group of sensors in the gas network;

wherein sensors from the first group of sensors are separate and distinct from sensors in the second group of sensors;

wherein the measurements from the first group of sensors define an input of the mathematical model and the measurements from the second group of sensors define an output of the mathematical model;

wherein the controllable or adjustable relief valves and throttle valves are controlled in a predetermined sequence and according to scenarios to generate leaks and obstructions respectively; and during an operational phase, establishing the mathematical model between the measurements of the first group of sensors and the second group of sensors to detect, locate and quantify leaks and obstructions in the gas network;

wherein the operational phase comprises the following steps:

controlling, if necessary, the relief valves and the throttle valves in a predetermined order and according to scenarios;

reading out the first group of sensors;

based on these readout measurements, calculating or determining values of the second group of sensors with help of the mathematical model;

comparing the calculated or determined values of the second group of sensors with the read values of the second group of sensors and determining the difference between them;

determining whether there is a leak and/or an obstruction in the gas network on the basis of the aforementioned difference and any of its derivatives comprising a mathematical quantity extractable from the difference; and generating an alarm if a leak or obstruction is detected and/or determining the location of the leak and/or obstruction and/or determining a flow rate of the leak and/or degree of obstruction of the obstruction and/or generating leakage and/or obstruction cost, wherein the location is determined by controlling the adjustable throttle and/or relief valves in a predetermined order;

wherein the operational phase is temporarily interrupted or stopped at preset times for identifying time-varying behaviors that were not captured by the mathematical model during the training phase, after which the training phase is resumed in order to redefine the mathematical model or a relationship between the measurements of different sensors, before the operational phase is resumed.

2. The method according to claim 1, wherein at least part of the flow sensors are placed in a vicinity of the relief valves.

3. The method according to claim 1, wherein the aforementioned sensors can measure one or more of the following physical parameters of the gas:

flow, pressure, differential pressure, temperature, humidity, and gas velocity.

4. The method according to claim 1, wherein the method for the training phase comprises a start-up phase, in which the aforementioned sensors are calibrated before use.

5. The method according to claim 4, wherein at least the second group of sensors are calibrated by means of an in-situ or self-calibration during operation.

6. The method according to claim 1, wherein the operational phase steps are sequentially repeated at a given time interval.

7. The method according to claim 1, wherein the relief valves are formed by drainage valves.

8. The method according to claim 1, wherein at least some of the sensors are integrated in one module together with a relief valve or throttle valve.

9. The method according to claim 1, wherein a sensor is provided in a vicinity of each relief valve and/or throttle valve in the gas network and/or vice versa.

10. The method according to claim 1, wherein the mathematical model is a black-box model.

11. The method according to claim 1, wherein the aforementioned mathematical model takes the form of a matrix and/or a nonlinear vector function with parameters or constants, where changes of output or 'targets' of the mathematical model are monitored during the operational phase.

12. The method according to claim 1, wherein differential pressure sensors over the throttle valves are used as state sensors which can determine the state or status of the throttle valves.

13. A gas network under pressure or under vacuum, the gas network is at least provided with:

one or more sources of compressed gas or vacuum;

one or more consumers, consumer areas of compressed gas or vacuum applications;

pipelines or a network of pipelines to transport the gas or vacuum from the sources to the consumers or consumer areas;

a plurality of sensors providing one or more physical parameters of the gas at different times and locations within the gas network;

wherein the gas network is further provided with:

a number of controllable or adjustable relief valves and a number of controllable or adjustable throttle valves;

one or a plurality of sensors, which can register the state or status of one or a plurality of relief valves and one or a plurality of throttle valves;

a data acquisition control unit for collecting data from the sensors and for controlling or adjusting the aforementioned relief valves and throttle valves;

a computing unit for carrying out the method according to claim 1.

14. The gas network according to claim 13, wherein the relief valves are formed by drainage valves.

15. The gas network according to claim 13, wherein at least some of the sensors are integrated in one module together with a relief valve or a throttle valve.

16. The gas network according to claim 13, wherein a sensor is provided in a vicinity of each relief valve and/or throttle valve in the gas network and/or vice versa.

17. The gas network according to claim 13, wherein the gas network is further provided with a monitor to display or signal leaks and obstructions, leakage flows, obstructions, leakage costs, obstructions, locations of leaks and obstructions.

18. The gas network according to claim 13, wherein the sensors capable of recording the status or state of a consumer are part of the consumers themselves.

19. The gas network according to claim 13, wherein the computing unit is a cloud-based computing unit, which may or may not be connected wirelessly to the gas network.

20. The gas network according to claim 1, wherein the scenarios comprise 'on', 'off', and 'intermediate' scenarios of the relief valves and throttle valves.

* * * * *